United States Patent Office 3,452,621
Patented July 1, 1969

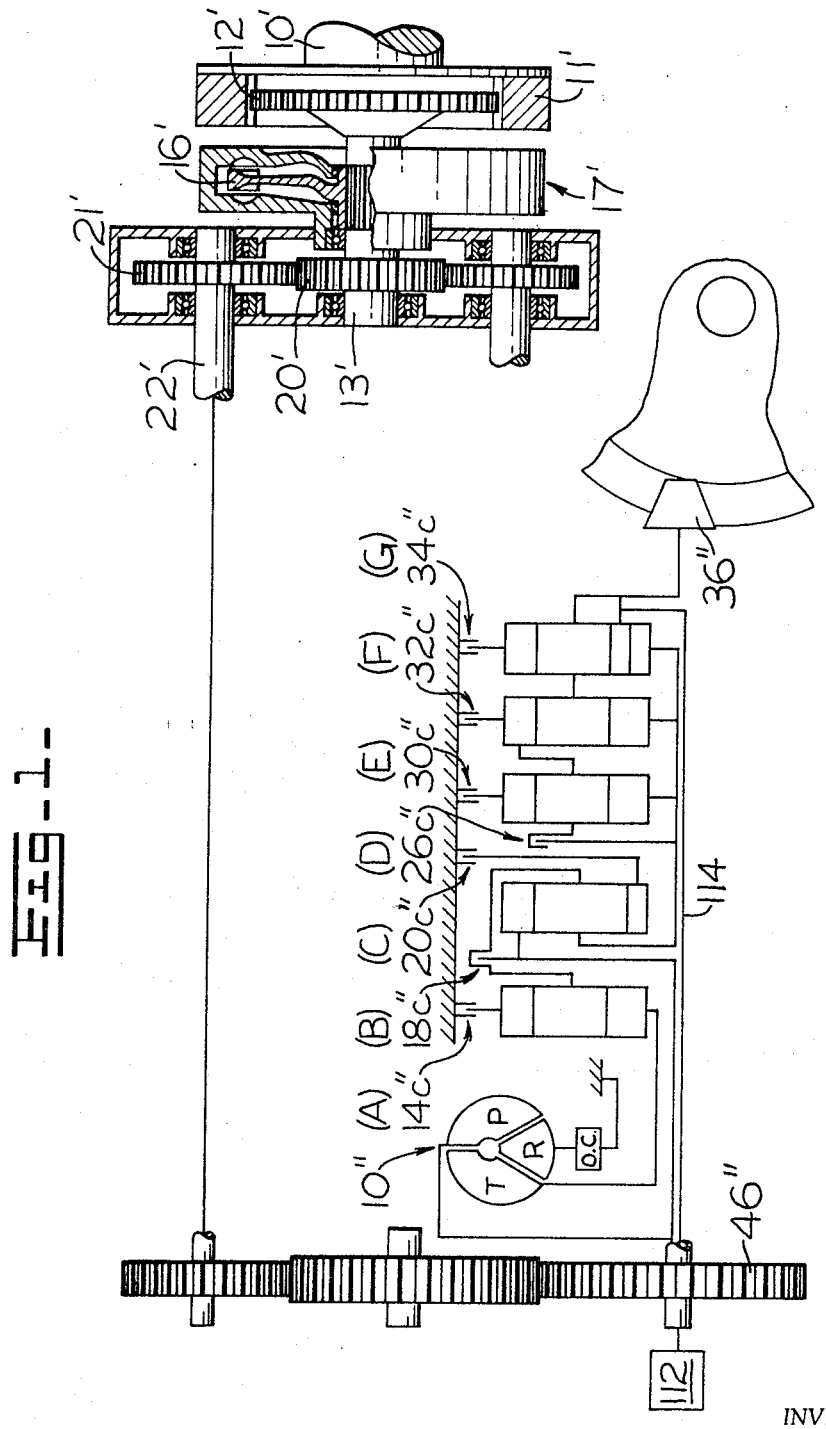

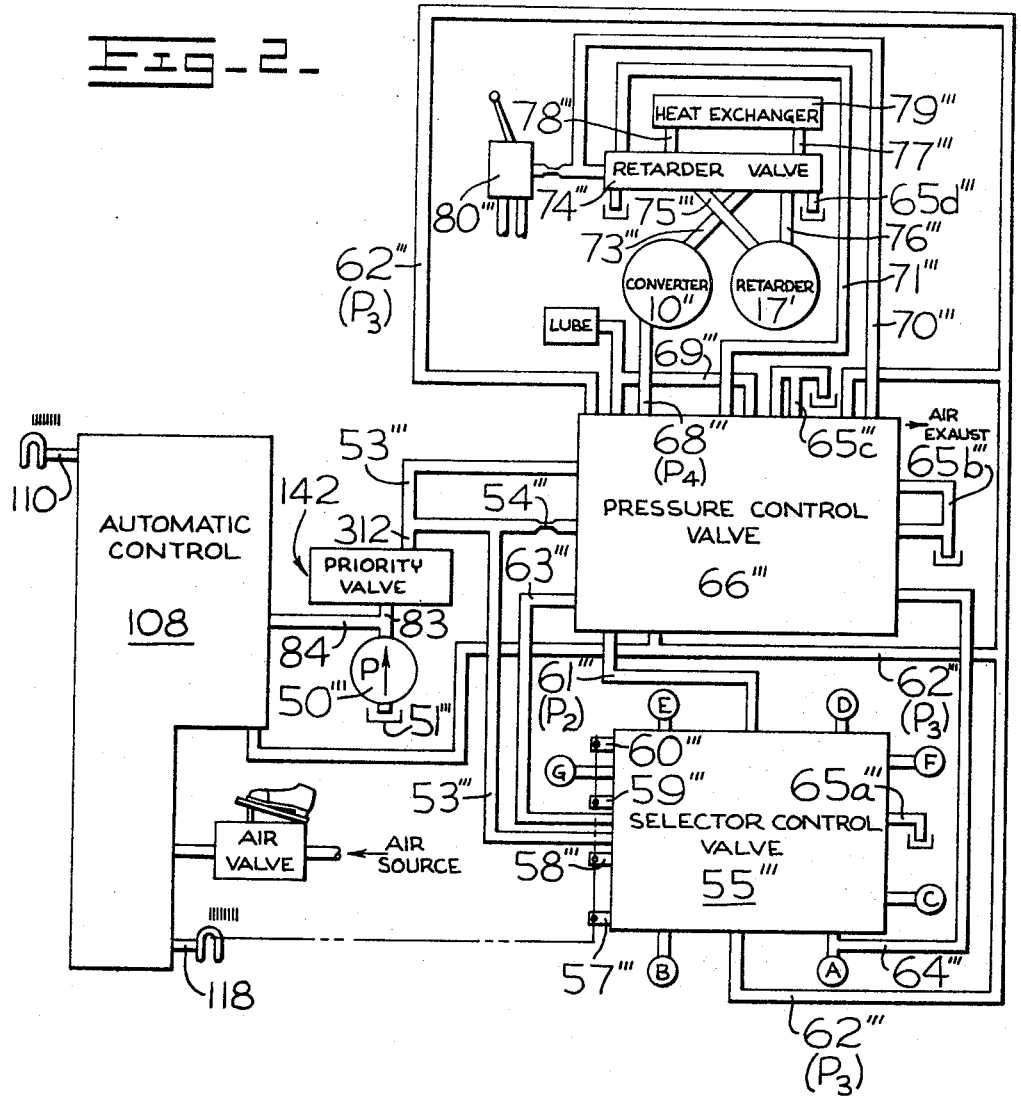

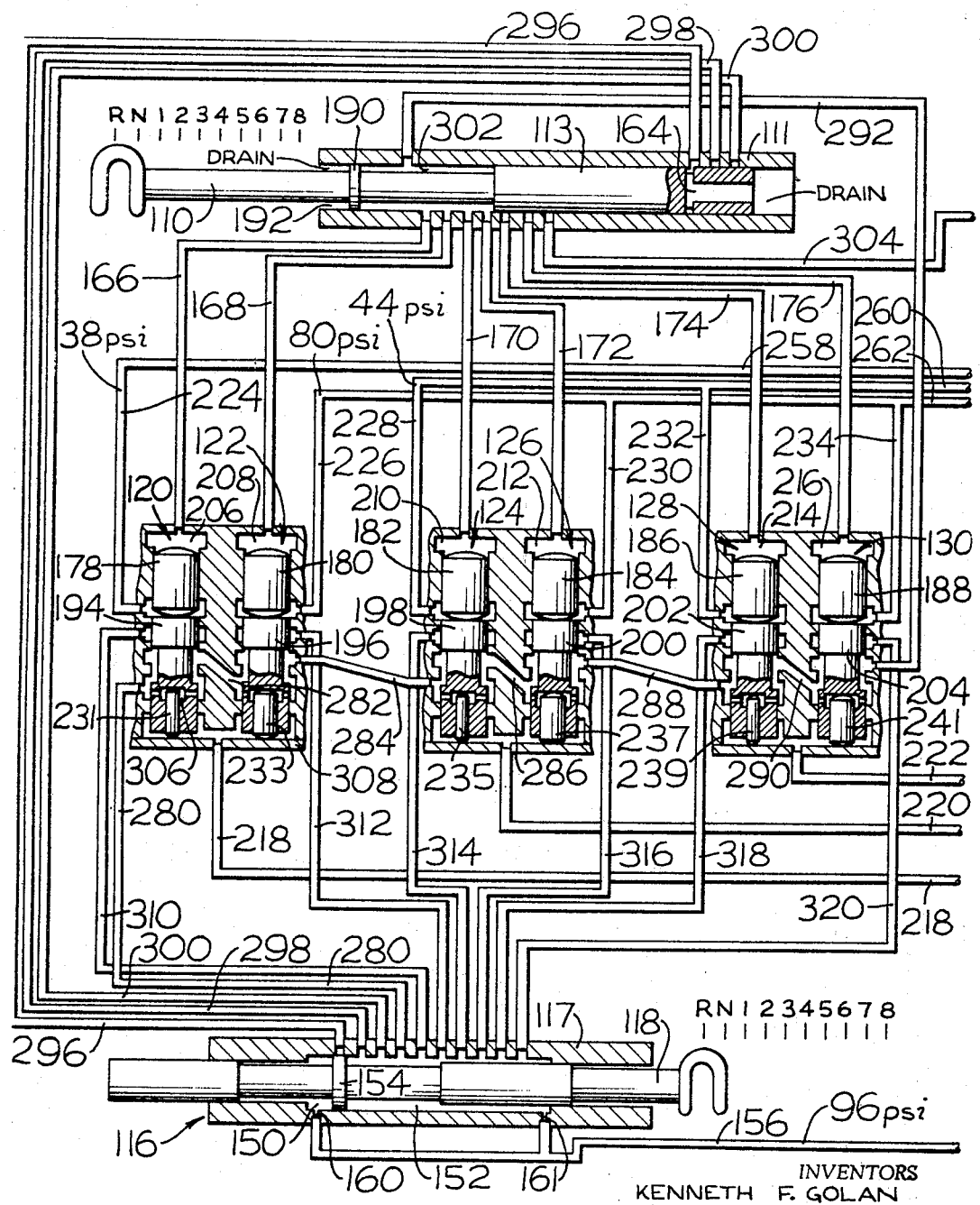

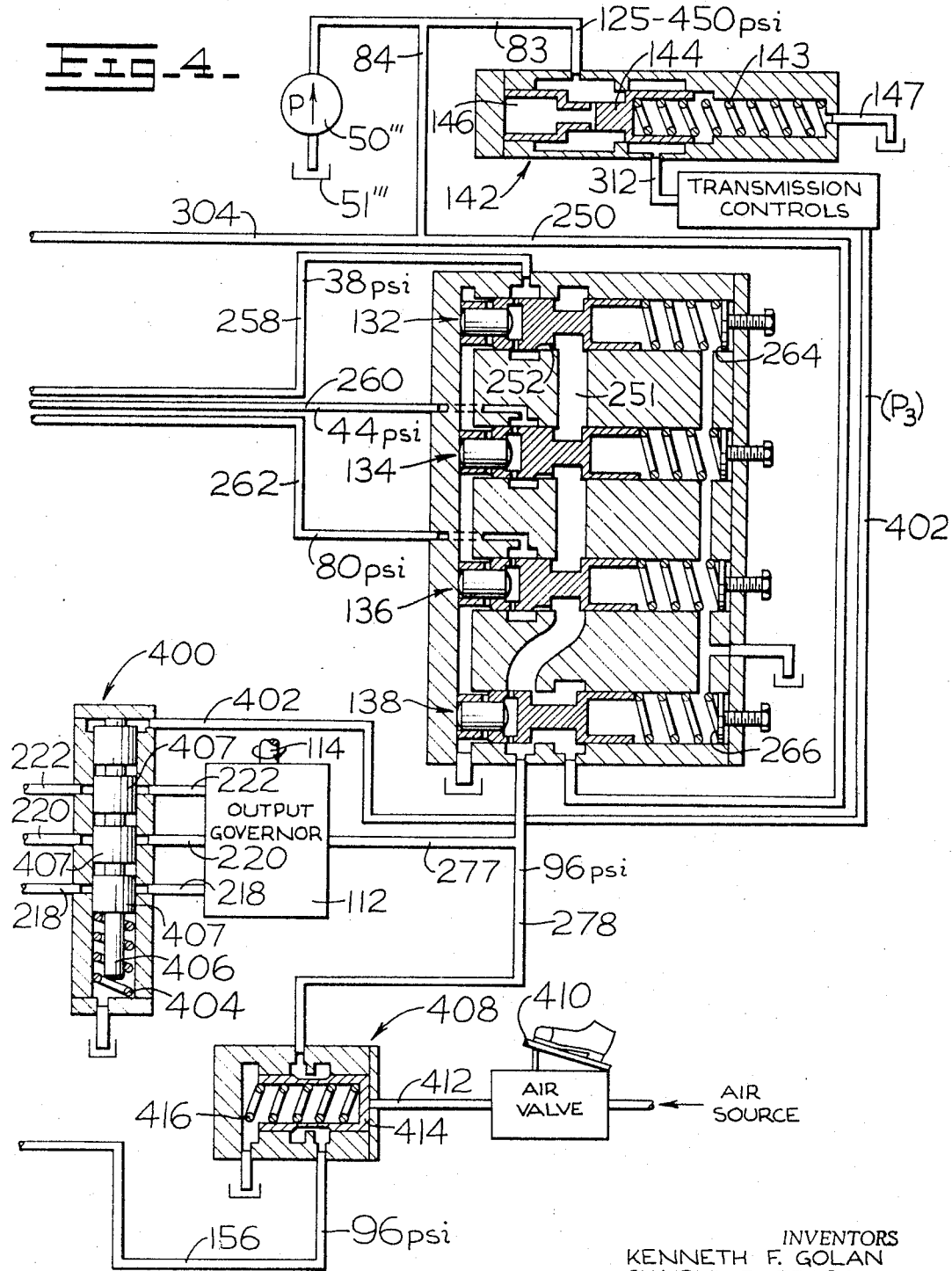

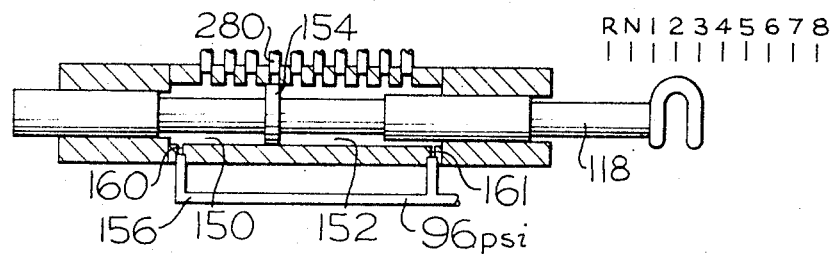
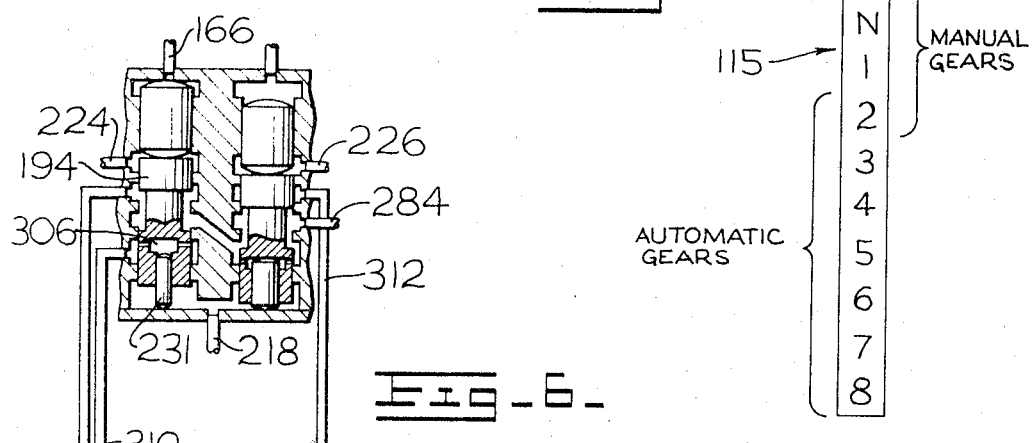
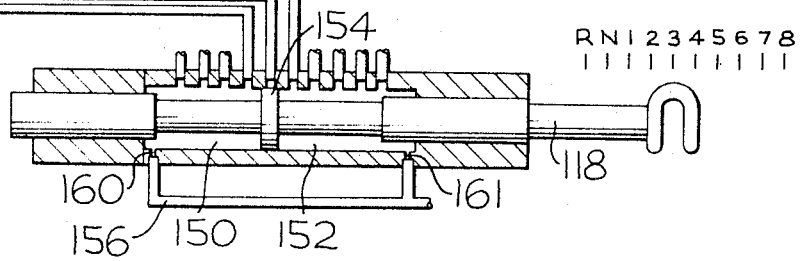

3,452,621
AUTOMATIC TRANSMISSION CONTROL
Kenneth F. Golan, Pekin, Shairyl I. Pearce, East Peoria, and Joachim Horsch, Washington, Ill., assignors to Caterpillar Tractor Co., Peoria, Ill., a corporation of California
Filed Sept. 20, 1966, Ser. No. 580,693
Int. Cl. F16h 3/74
U.S. Cl. 74—752                                  3 Claims

ABSTRACT OF THE DISCLOSURE

An automatic transmission control for the automatic range of a transmission which automatically translates the load conditions of the vehicle and desired gear selection into hydraulic pressures that act to upshift, downshift and hold the proper gear ranges for optimum use of the machine.

---

This invention relates to an all hydraulic automatic transmission control device which control device can be attached to existing transmission controls and the like. More particularly the automatic transmission control serves to connect the previously manual control spools to the gear selector lever through an automatic system which functions in accordance with transmission output speed and the gear shift lever position.

In transmission systems where the converter is matched to the engine at rated speed to provide rapid acceleration from a standstill the engine speed does not change greatly from a stall to racing condition and consequently it is not a valid indicator of ground speed in for example, first or second gear. Shifts from converter to mechanical range at low ground speeds can lead to very high relative clutch engagement speeds and such undesirable shifts can result in extremely high energy absorption rates and possible clutch damage. Such problems are compounded by frequent use of such machines by operators who do not appreciate the nature of such transmissions.

As a result considerable attention has been devoted in prior art devices to obtaining optimum machine performance through the use of indicator lights, calibrated speed indicator dials, etc., to inform the operator when to shift. Unfortunately, these devices demand constant vigilance and result in operator fatigue. Also, such indicators are often over-simplified and fail to accurately reveal what is happening to the power train.

Even in automatic transmissions an override is desirable, especially at the lower speed end, to provide more effective matching of the vehicle to the external conditions imposed upon it. For instance, the low ground speed circumstances accompanying loading of an earth moving scraper often results in over-frequent and cyclic gear shifting between adjacent steps with a fully automatic system. But with an override the vehicle operator may hold the system in a given range and achieve the operation desired without the higher transmission wear caused by excessive shifting. Further, at the higher speeds a desirable feature would be the ability to impose a maximum gear shift limit on the transmission to prevent it from upshifting when conditions dictate that almost immediate downshifting will be required.

The principal object of the invention is to provide a transmission control for the automatic range of the transmission which automatically translates the load conditions of the vehicle and desired gear selection into hydraulic pressures that would act to upshift, downshift and hold the proper gear ranges for optimum use of the machine. For safety purposes the control device should also provide absolute operator control over all downshifts if necessary.

Another object of the invention is to provide a control device which permits manually controlled ranges at low speeds to prevent unwanted shifting during periods of transient torque loads.

Yet another object of the invention is the provision of a control system which comprises a load responsive device (speed sensing governor), reference pressure system and an automatic selector valve system for providing automatic shifts.

A still further object of the invention is the provision of automatic selector valves which cooperate with a hydraulic governor and a reference pressure system to provide different pressure values for determining the upshift and downshift points between any two gears in the automatic range of the transmission.

Other objects and advantages of the invention will become apparent from the following detailed description when taken in conjunction with the accompanying drawing, wherein:

FIG. 1 schematically illustrates a transmission drive train of the invention;

FIG. 2 schematically illustrates the control device of the present invention in conjunction with a hydraulic system for engaging the drive train of FIG. 1;

FIGS. 3 and 4 are sectional views depicting the details of the various components comprising the control of the present invention;

FIGS. 5 and 6 illustrate components of the control device in different operational conditions than that shown in FIGS. 3 and 4;

FIG. 7 illustrates the manual and automatic ranges at the operator's shift console;

TRANSMISSION DRIVE TRAIN

Figure 8:
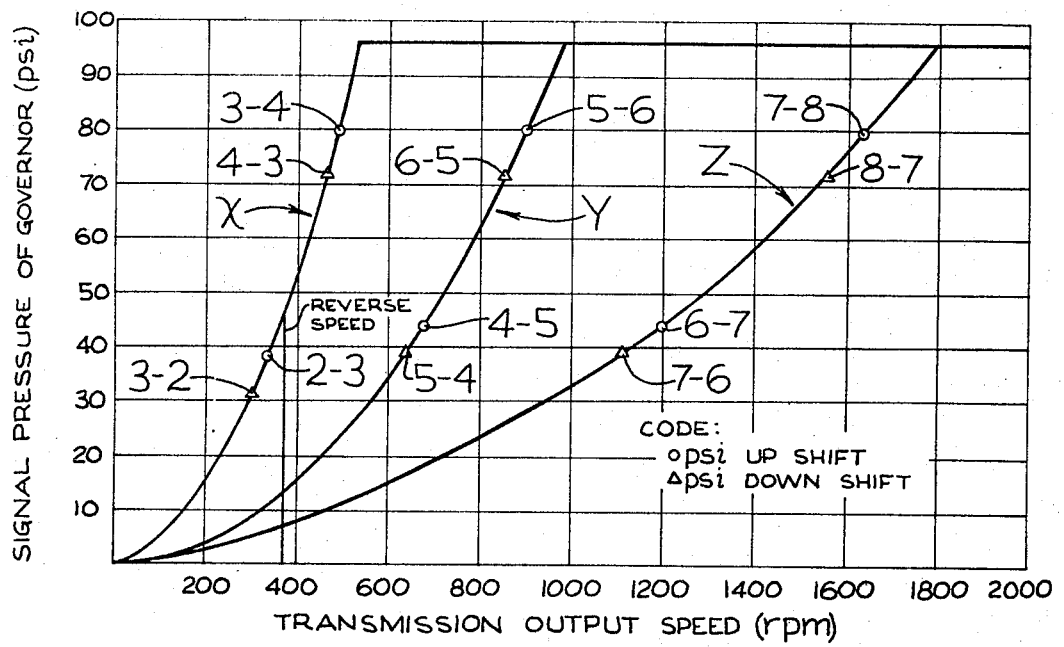
FIG. 8 is a graph illustrating three speed-pressure curves produced by a governor in accordance with the invention; and, FIG. 9 depicts an indicator dial for use by the operator in conjunction with the shift console of FIG. 7.

The transmission drive train illustrated in FIG. 1 is fully disclosed in two co-pending applications, assigned to the assignee of this application. The numerals accompanied by a prime symbol (′) denote structures having corresponding numerals, disclosed in U.S. patent application Ser. No. 508,890, now Patent No. 3,352,385 entitled "Hydrodynamic Retarder" and filed on Nov. 22, 1965 by Lowell E. Johnson.

This hydrodynamic retarder assembly comprises an input or engine driven shaft 10′ suitably arranged to drive a flywheel 11′. A gear 12′ is preferably splined to the flywheel and a rotor shaft 13′ which in turn drives a rotor 16′. Rotor shaft 13′ is suitably arranged to drive transfer gears 20′ and 21′. Gear 21′ is further arranged to drive a shaft 22′ to provide a power input to a multi-speed gear assembly by means of the schematically illustrated transfer gears.

U.S. patent application Ser. No. 467,267, now Pat. No. 3,347,113 entitled "Transmission" and filed on June 28, 1965 by Charles A. Ramsel, discloses the specific constructions and arrangements of the illustrated multi-speed transmission. The numerals disclosed in FIG. 1 correspond to those appearing in the last mentioned application, but are accompanied by a double prime symbol (″). As illustrated, a transfer gear 46″ is arranged to provide a power input to the multi-speed assembly comprising a torque converter 10″ and a power train comprising a series of brakes and clutches arranged to be selectively actuated. The multi-speed gear assembly is suitably arranged to drive an output member or pinion gear 36″ which operatively meshes with a face gear of the vehicle's differential. The clutches and brakes may also be termed "drive establishing means."

HYDRAULIC CONTROL SYSTEM

Reference is now made to the right-hand portion of FIG. 2 which schematically illustrates a hydraulic control system utilized to selectively actuate the transmission drive train illustrated in FIG. 1. The said hydraulic control system is fully disclosed in a copending application assigned to the assignee of this application. The numerals accompanied by a triple prime symbol (''') denote structures having corresponding numerals, disclosed in assignee's U.S. patent application Ser. No. 521,320, now Patent No. 3,386,540, entitled "Transmission and Control System Therefor" and filed on Jan. 18, 1966 by Joachim Horsch, Hugh C. Morris, Shairyl I. Pearce and Gerald D. Rohweder.

A positive displacement pump 50''' is suitably connected to the engine by gear means (not shown) to pump pressurized fluid from sump 51''' through a priority valve, which forms a part of the present invention, and on through conduit 53''' to the transmission controls of application Ser. No. 521,320. Conduit 53''' communicates the fluid via branches thereof, one of which includes restriction 54''', to a selector control valve 55''' and a pressure control valve 66''' for purposes fully explained in application Ser. No. 521,320.

Selector control valve 55''' comprises a housing constructed and arranged to slidably mount valve spools 57''', 58''', 59''', and 60'''. The valves function to selectively communicate fluid to clutches and/or brakes A through G. Conduits 61''' through 64''' and drain conduit 65a''' communicate with the selector control valve.

Pressure control valve 66''' is integrated into the system and arranged to communicate with aforementioned conduits 53''' and 61''' through 64'''. In addition, the pressure control valve communicates with a torque converter inlet conduit 68''', lubrication conduit 69''', drain conduits 65b''' and 65c''', and conduits 70''' and 71''' of the hydrodynamic retarder system.

FIG. 2 also schematically illustrates the retarder control system, arranged to be supplied with fluid by converter 10'' via conduit 73'''. A retarder control valve 74''' is arranged to be selectively actuated to communicate fluid from conduit 73''' to a conduit 75''' which in turn communicates with retarder 17'. A conduit 76''' is arranged to selectively communicate through the retarder control valve to a drain conduit 65d''' or a conduit 77'''. Conduit 77''' and a conduit 78''' are arranged to communicate the fluid through a conventional heat exchanger 79''' to cool the fluid passed through the torque converter and retarder.

An air control valve 80''' is arranged to selectively actuate the retarder control valve. This air control valve may be of the type disclosed in U.S. Patent No. 3,057,666, entitled "Brake Control for Tractor Trailer Combinations with Retarder Systems" and issued on Oct. 9, 1962 to A. W. Sieving et al. This patent is assigned to the assignee of this application.

AUTOMATIC TRANSMISSION CONTROL

Referring now to FIGS. 3 and 4 in conjunction with FIGS. 1 and 2, the pump 50''' continuously supplies pressure fluid in a range from 125 to 450 p.s.i. to conduits 83 and 84. Conduit 83 supplies pump pressure to a priority valve 142 which has a coil spring 143 for biasing spool 144 to the closed position shown whenever the pressure in conduit 83, and consequently spool cavity 146 drops below 125 p.s.i. Normally, however, the pressure in conduit 83 is at least 125 p.s.i. thereby moving priority valve spool 142 to the right so that the fluid pressure of conduit 83 is communicated to the transmission controls by way of conduit 312. A drain 147 is provided on the priority valve to prevent any hydraulic lock which might occur due to fluid leakage.

Conduit 84 leads to the automatic transmission control shown generally at 108 in FIG. 2. The automatic control in general serves to communicate the position of a manual control spool 110 so as to remotely and automatically position a power spool 118 which through any suitable linkage automatically controls the selector valve spools 57''', 58''', 59''' and 60'''. The automatic transmission control 108 senses load through an output governor 112 which measures the speed of the output planetary carrier of the power train shown in FIG. 1. As shown, the output governor 112 is mechanically connected to the output carrier of the power train through a long quill shaft 114. The governor 112 provides a plurality (three in the instant application) of separate hydraulic pressure signals which are in direct proportion to the aforementioned output speed and upon which the various shift points of the system depend. The specific details of the governor are not the subject of this application and any suitable type may be utilized. It is preferred, however, to use a governor of the type disclosed in assignee's U.S. patent application Ser. No. 580,731, entitled "Hydraulic Governor" to Joachim Horsch and filed Sept. 20, 1966.

The various major components of the automatic transmission control 108 will now be described.

MANUAL CONTROL VALVE

As shown in FIGS. 3 and 4, conduit 84 normally supplies 125 p.s.i. minimum to conduit 304 which in turn supplies this pressure to housing 111 of a manually controlled valve spool 110. Valve spool 110 has an enlarged portion 113 which, depending upon its position, can either block off conduits 296, 298 and 300 or selectively drain them via groove and port arrangement 164. The valve housing 111 is also provided with a compartment 302 which may selectively communicate with a conduit 292 and with a group of conduits 166, 168, 170, 172, 174 and 176 which latter conduits may hereinafter be referred to as "hold" lines. These "hold" lines further communicate with a series of automatic selector valves which will be described in greater detail infra.

The spool 110 is also provided with a land 190. With rightward movement of manual control spool 110, the pressure normally present in "hold" lines 166, 168, 170, 172, 174 and 176 is initially shut off as the spool land 190 passes thereover and then subsequently these "hold" lines are opened to communicate with a drain 192.

SHIFT REFERENCE PRESSURE VALVES

As shown in FIG. 4, conduit 84 also communicates with a conduit 250 which leads to a downshift reducing valve 138. As will be more fully understood in the subsequent discussion, the downshift reducing valve functions to reduce the pressure supplied by conduit 250, which is normally over 400 p.s.i., to a pressure of 96 p.s.i. which is communicated to a common rail conduit 251. The conduit 251 then communicates the 96 p.s.i. to a plurality of shift reference valves 132, 134 and 136. The valves 132, 134 and 136 are all conventional pressure reducing valves and of identical construction having throttling slots 252 which serve to establish reduced reference pressures from the common rail pressure in conduit 251 through adjustment of valve spool biasing springs 264. In the instant application the valves 132, 134 and 136 meter at their respective throttling slots 252 to establish reference pressures of 38 p.s.i., 44 p.s.i. and 80 p.s.i. in conduits 258, 260 and 262. The conduits 258, 260 and 262 are variously connected to a series of automatic selector valves 120, 122, 124, 126, 128 and 130 (FIG. 3) for a purpose which will be more clearly understood, infra.

DOWNSHIFT REDUCING VALVE

Downshift reducing valve 138 is supplied with fluid at 125 to 450 p.s.i. from conduit 250 as mentioned above. In construction the downshift reducing valve 138 is similar to the shift reference pressure valves 132, 134 and 136. However, it handles larger flow and this makes unnecessary any throttling slot arrangement. Manual adjustment of the biasing spring means 266 may be used to adjust the setting of downshift reducing valve 138 to approximately 96 p.s.i. which as a consequence will control all of the downshift points of the system in a manner which will be further understood from the discussion infra. For the present discussion it should be noted that the 96 p.s.i. flowing out of the valve 138 is not only communicated to passage 251 but also to the output governor 112 via conduit 277 and to a hold valve 408 via conduit 278. The hold valve 408, whose function will be specifically described later, is normally in the open position, as shown, such that the 96 p.s.i. flowing out of the downshift reducing valve 138 is normally communicated through conduit 156 to compartments 150 and 152 of a power cylinder assembly 116 (see FIG. 3).

POWER SPOOL ASSEMBLY

As shown in FIG. 3 the 96 p.s.i. of conduit 156 communicates with compartments 150 and 152 disposed on either side of a spool land 154 formed on the power spool 118. The diameter of land 154 is larger than the diameter at the ends of the spool in order to provide a differential area so that if the pressures in compartments 150 and 152 are different the spool will move. Flow limiting orifices 160 and 161 are provided at the power spool to control fluid flow into chambers 150 and 152. Conduits 296, 298 and 300 lead out of the power spool assembly 116 for communication with the manual control valve housing 111 as previously described. Conduits 280, 310, 312, 314, 316, 318 and 320 all communicate with various members of the selector valves 120, 122, 124, 126, 128 and 130 in a manner which will be more fully understood from a later description with regard to the selector valves. The power spool is positioned by balancing of the spool land 154 to equal pressures in compartments 150 and 152. The position is determined by draining one of conduits 296, 298, 300, 280, 310, 312, 314, 316, 318 or 320 and having land 154 cover said conduit.

AUTOMATIC SELECTOR VALVES

As shown in FIG. 3 selector valves 120, 122, 124, 126, 128 and 130 are provided for effecting an automatic shift when the proper shift point is reached. Each of the selector valves is similarly constructed and is respectively provided with housings which define internal cavities 206, 208, 210, 212, 214 and 216. Each of the respective cavities receives movable upper holding slugs 178, 180, 182, 184, 186 and 188. Below each of the upper holding slugs there are provided movable selector spools 194, 196, 198, 200, 202 and 204 each of which defines a cavity 306 in its lower end for receiving one of the smaller downshift slugs 231, 233, 235, 237, 239 and 241. It should be noted that when all of the selector valve spools 194–204 are in their lower positions, as shown, fluid pressure may be communicated from conduit 280 through each of the selector valves 120–130 to the conduit 292 by means of conduits 282, 284, 286, 288 and 290.

The selector valve housings 308 serve to divide the six selector valves 120–130 into three groups. Each group contains two selector valves which sense pressure from the output governor 112 via three conduits 218, 220 and 222. These three conduits communicate three different speed sensitive governor pressures, denoted as pressure curves X, Y and Z in FIG. 8, to the lower ends of the selector valve spools 194–204. Other conduits emanating from conduits 258, 260 and 262, and denoted as conduits 224, 226, 228, 230, 232 and 234, communicate reference pressures from the shift reference pressure valves 132, 134 and 136 to the selector valve cavities 206–216 at a point intermediate the upper holding slugs 178–188 and the selector spools 194–204. Thus, conduit 224 communicates 38 p.s.i. to a location in cavity 206 below upper holding slug 178 and above selector spool 194, conduit 226 communicates 80 p.s.i. to a location in cavity 208 below upper holding slug 180 and above selector spool 196, conduit 228 communicates 44 p.s.i. to a location in cavity 210 below upper holding slug 182 and above selector spool 198, conduit 230 communicates 80 p.s.i. to a location in cavity 212 below upper holding slug 184 and above selector spool 200, conduit 232 communicates 44 p.s.i. to a location in cavity 214 below upper holding slug 186 and above selector spool 202, and conduit 234 communicates 80 p.s.i to a location in cavity 216 below upper holding slug 188 and above selector spool 204.

In order to achieve a follow-through shift it is necessary to positively insure that a shift is made from a lower to a higher horsepower condition. This dictates that a spread is needed between the upshift and downshift points, and to do this a series of smaller slugs 231, 233, 235, 237, 239 and 241 are utilized. Such a spread means that while the upshift between any two gears in the automatic range occurs at one r.p.m. value the downshift occurs at a suitably lower r.p.m. value to prevent excessive valve shifting or hunting. Upshifts are made by comparing reference and hydraulic governor pressures directly. However, to achieve a lower required governor pressure for downshifting a third pressure is at times introduced into cavities 306 above the lower slugs 231–241. Said third pressure is higher than governor or reference pressure at the shift points and is present in the cavities 306 only when the selector spools are in the upward position as will be better understood from the following description with respect to downshifts.

OUTPUT GOVERNOR

The hydraulic output shaft governor 112 provides speed sensitive pressure signals which determine the various shift points in the automatic range. Though not shown, the hydraulic governor 112 contains three centrifugally force-operated pressure reducing valves each having different mass and reaction surfaces as clearly disclosed in previously referred to U.S. patent application Ser. No. 580,731.

For purposes of the present application it is sufficient to note that rotation of shaft 114 produces centrifugal force which acts on the three governor pressure reducing valves to result in the emission of three continuous pressure signals heretofore identified as governor curves X, Y and Z as shown in FIG. 8.

FIG. 8 illustrates that each of the governor pressure-speed curves X, Y and Z has a pressure range from 0 to 96 p.s.i. However, the r.p.m. range in which each of these curves achieves a given pressure value differs in ascending order from curve X to curve Z. Thus, for example, curve X reflects 30 p.s.i. at approximately 300 r.p.m., while curve Y reflects 30 p.s.i. at approximately 580 r.p.m. and curve Z reflects 30 p.s.i. only after the r.p.m. value has increased to approximately 930 r.p.m. As previously mentioned these governor pressures X, Y and Z are communicated to the selector valve groups via conduits 218, 220 and 222 such that when the proper r.p.m. is reached in the automatic range the selector spools 194–204 will move upwardly or downwardly, according to whether vehicle conditions warrant and demand an upshift or downshift.

During a shift transient pressure oscillations could be communicated through governor 112 due to power train "wind up" which pressure oscillations could result in the communication of erroneous shifting signals to the selector valves. To prevent such occurrences a blocker valve 400 is provided on the downstream side of governor 112. The blocker valve 400 serves to delay or cut-off the governor conduits 218, 220 and 222 from the selector valves during certain shift periods. Proper delay is afforded by communicating load clutch pressure ($P_3$) from the transmission controls to the top of valve 400 via conduit 402. During a shift $P_3$ drops sufficiently to allow a spring 404 to move spool 406 upwardly to a position whereby the lands 407 interrupt communication of the governor signals to the selector valves (see FIG. 4). Normally, the blocker valve will be set to operate whenever $P_3$ drops below approximately 200 p.s.i. and provides sufficient time for dampening of component fluctuations to a steady rate which eliminates "hunting" of the automatic control.

SHIFT SEQUENCES

The shift console 115 shown in FIG. 7 shows the one reverse, neutral, and eight forward speeds that may be manually selected by the operator. The reverse, neutral, and first two forward positions are strictly manual (rather than automatic) positions and, therefore, reflect single conditions of operation despite speed and load changes. This can be permitted because the torque converter provides a broad operating range in the lower gears; this feature serves to prevent overfrequent shifting of any automatic system when its operation would vary between two adjacent modes of operation. On the other hand, if the gear shift lever is placed in third through eighth positions the automatic system is placed into operation wherein the gear shift lever serves as the upper limit of transmission operation. In this automatic range, ground speed acts to shift the transmission up to the limit placed upon it or down to second gear. Therefore, the position of the gear shift lever is a true indication of the transmission gear only in the manual range. In other words, if the lever is placed, for example, in fifth gear automatic range, the vehicle operating conditions might dictate transmission operation in second, third, fourth or fifth and a transient or constant state. It is to be understood that it is within the scope of the invention to alter the gears comprising the manual and automatic ranges to suit the operating characteristics of the particular vehicle upon which the automatic transmission control is to be attached.

In the paragraphs below the aforementioned features of the system will be discussed more clearly with respect to the various shift sequences.

*Reverse.*—With the pump 50''' operating, pressure fluid at a value of at least 125 p.s.i. is communicated via conduit 83 through priority valve 142 and on through conduit 312 to the transmission controls. This same pressure fluid at 125 p.s.i. minimum is also communicated via conduit 84 to a conduit 304 leading to the manual selector valve housing 111 and also to the conduit 250. Once the operator moves the manual control valve spool 110 to the reverse position (R of FIG. 3), the enlarged land 113 of said spool blocks off communication of conduit 304 with compartment 302 of the manual control valve. The pressure fluid is then shunted through conduit 250 and communicated to the downshift reducing valve 138 which provides 96 p.s.i. to the shift reference pressure valves 132, 134 and 136 through common rail 251. Each of the shift reference pressure valves establishes a reference pressure which is variously communicated through the conduits 258, 260 and 262 and branch conduits 224–234 to a location in the selector valve cavities 206–216 which location is intermediate the upper holding slugs 178–188 and the selector valve spools 194–204, as previously described. Downshift reducing valve 138 also establishes 96 p.s.i. in the conduit 277 leading to governor 112 and in the conduit 278. The 96 p.s.i. in conduit 278 is then communicated through the holding valve 408 to a conduit 156 which leads through orifices 160 and 161 to compartments 150 and 152 on either side of the power spool land 154. At this point it should be noted that conduit 296 leads out of the power spool housing 117 to the manual control spool port 164 which leads to the drain. This will drop the pressure in compartment 150, which is supplied by the orifice 160 because the restriction to the drain port is small in comparison with the orifice restriction. As a result, the power control spool land 154 will move to the position shown to block-off conduit 296 to reestablish equal pressures in compartments 150 and 152. Thus the movement of power spool 118 results in the transmission being shifted into reverse gear. A suitable tracing of conduits 298, 300, 310, 312, 314, 316, 318 and 320 will show that they all lead to a blocked condition and therefore at this point have no effect upon the system. However, conduit 280 communicates the 96 p.s.i in compartment 152 of the power spool assembly 116 through each of the selector valves 120–130 by way of conduits 282, 284, 286, 288 and 290 to an output conduit 292. The output conduit 292 then leads through the manual control valve compartment 302 to communicate the 96 p.s.i. to hold lines 166, 168, 170 and 172 which lead to the cavities of the first four automatic selector valves 120, 122, 124 and 126. Thus, the 96 p.s.i. pressure in the hold lines 166, 168, 170 and 172 prevents any automatic shifting since it is greater than the highest counterbalancing pressure that could be supplied to the bottom of selector valves 120, 122, 124 and 126 from the output governor conduits 218 and 220. This latter feature can also be noted from FIG. 8 wherein it is illustrated that the governor pressures corresponding to a transmission output r.p.m. of approximately 380 r.p.m. for reverse are appreciably lower than the 96 p.s.i. supplied from the hold lines 166, 168, 170 and 172.

*Neutral.*—Movement of manual control valve spool 110 to the right communicates the conduit 298 to drain through opening 164. Consequently, pressure in power cylinder compartment 152 drops due to orifice 161 allowing the higher pressure in compartment 150 to move power spool 118 rightwardly until land 154 covers conduit 298 (N). Since conduit 298 is the only conduit leading to a drain, and all other conduits leading from the power spool are blocked, movement of the power spool is independent of the position of the selector valves.

*First.*—Essentially the same as reverse and neutral above, wherein a conduit 300 is opened to drain through opening 164, and land 154 of power spool 118 follows to cover conduit 300 and thus effect a transmission shift to first gear.

*Second.*—With the selection of second gear, spool 110 moves rightwardly to communicate conduit 292 to the drain 192 by virtue of the position of spool land 190. Spool land 113 now blocks conduits 296, 298 and 300 (R, N, 1), and opens manual valve compartment 302 to the full pressure (125 to 450 p.s.i.) in line 304. Thus, hold lines 166, 168, 170, 172, 174 and 176 are all supplied with high pressure fluid such that all automatic selector valves 120–130 are held thereby overcoming the maximum pressure that could be supplied by the governor through conduits 218, 220 and 222. Since conduit 292 opens to drain, conduit 280 communicating with 292 across the selector valves is also open to drain and power spool land 154 moves to a position across conduit 280 to effect a transmission shift to second gear (see FIG. 5).

*Third.*—It should be noted that a shift from second to third, or for that matter any shift above second, places the system in the automatic as opposed to the manual range. Thus, moving the manual control spool to position 3 opens the hold line 166 to drain 192. The remaining hold lines are still at main pump pressure, however, via conduit 304 and manual spool cavity 302.

Whether or not the transmission is actually shifted into third gear forward after the manual spool 110 is placed in position 3 depends entirely upon vehicle speed. Viewing FIG. 8 in conjunction with FIGS. 3 and 4, it will be noted that if the vehicle speed is below 340 r.p.m. then the governor signal pressure (curve X) is less than 38 p.s.i. in conduit 218. Since the reference pressure in line 224 is 38 p.s.i., the selector valve spool 194 remains down (though upper holding slug 178 has moved up since hold line 166 now leads to drain 192) and the power spool land 154 does not move from position 2 (FIG. 5) since line 280 is still open to drain via the selector valve conduits 280–290 and conduit 292.

Once the vehicle speed exceeds approximately 340 r.p.m. (FIG. 8) then the governor pressure in conduit 218 exceeds the 38 p.s.i. reference pressure supplied via conduit 224 to the top of selector valve spool 194. Therefore, spool 194 and slug 231 move up, closing off communication between conduit 280 and the drain 192 via conduits 282, 284, 286, 288, 290 and 292. Upward movement of spool 194 also opens conduit 310 to drain 192 via conduits 282–290 and 292 (see FIG. 6). Power spool 118 is then unbalanced due to a drop in pressure in compartment 152 and begins moving from second gear position to the right and the pressure available at the power spool is connected to conduit 280, communicated to spool cavity 306 above slug 231, and provides a "snap action" that moves spool 194 upwardly the full travel. Slug 231, of course, moves downwardly to contact plate 308. Previously blocked conduit 310 is open to drain via 282, etc., as mentioned above, such that compartment 152 of the power spool is depressurized allowing the power spool to move to the right to third position (see FIG. 6).

It should be noted that movement of the power spool 118 into third position causes movement of the spools 57'''–60''' (FIG. 2) and consequently a shift into third gear. As the shift to third gear is being made the clutch fill pressure drops to approximately 55 p.s.i. This drop in pressure due to filling of the clutches is immediately sensed in both line 312 and 403 (see FIG. 4). This drop in pressure in line 312 causes the priority valve 142 to close under the action of spring 143 to the position shown. Closing of valve 142 ensures that the pressure in conduit 84 which supplies pressure to the holding lines via conduit 304 is maintained. It also ensures that the pressure in conduit 250, which ultimately supplies pressure to the shift reference valves, for establishing the shift reference pressures, is maintained. It should also be noted that when this pressure drop is communicated through conduit 402 the blocker valve lands 407 move to the position shown and this prevents the governor 112 from sending any transient fluctuation signals (due to inertial changes within the power train) to the selector valves which signals might result in unwanted shifts.

*Fourth through eighth.*—Upshifts continue in direct relationship to the position of manual control valve spool 110 and the governor pressures. At 491 r.p.m. (FIG. 8) governor curve X supplies sufficient pressure to the bottom of selector valve 122 to move spool 196 upwardly with the same "snap action" mentioned above. This opens conduit 312 to drain 192 via conduits 284, 286, 288, 290 and 292 and consequently power spool land 154 moves to position 4. Similarly, automatic selector valves 124, 126, 128 and 130 move upwardly achieving fifth through eighth gears as the corresponding governor upshift points are reached.

*Downshifts.*—A downshift from third to second will now be described, it being understood that all downshifts in the automatic range occur in the same manner. Under conditions of high rolling resistance to the wheels of the vehicle, the output r.p.m. might drop below 340 r.p.m. (the upshift point) and still not influence the third gear condition shown by FIG. 6. A "spread" between upshift and downshift points occurs because the "average" pressure urging the selector spool upwardly is greater than the governor pressure provided through conduit 218, since the cavity 306 is open to the pressure in line 280 as shown in FIG. 6 when the spool is in the upward position. However, should output r.p.m. continue to decrease resulting in a drop in governor pressure in conduit 218 below approximately 31 p.s.i. (see FIG. 8) the reference pressure of 38 p.s.i. acting on the top of selector spool 194 would overcome the upward forces acting on the bottom of spool 194 and in cavity 306 thereby causing (1) the drain 192 (via 282, etc. and 292) to be cut-off from conduit 310, and (2) conduit 280 to be communicated with the drain 192 via conduits 282, etc., and 292. Consequently the power spool 118 would cause a downshift to second gear due to a reduction in pressure in compartment 150.

HOLD VALVE

As shown in FIG. 4 a hold valve 408 may be incorporated in the system to prevent any automatic shift where the operator of the vehicle anticipates a need for preventing shifts in order to maintain engine speed at a given r.p.m. level. By operation of a foot-operated pedal 410, air at 100 p.s.i. is delivered from any suitable source to conduct 412 which urges spool 414 leftwardly overcoming the pressure of a spring 416. Leftward movement of spool 414 prevents the 96 p.s.i. fluid pressure in conduit 278 from reaching the power cylinder assembly 116 via conduit 156. As a result, all automatic and manual shifts are halted until the foot actuated pedal 410 is relieved.

Figure 9:
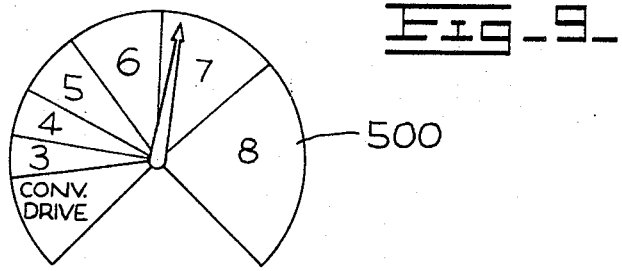

Since the shifting lever associated with console 115 (FIG. 7) is not a valid indicator of the true operating gear when in the automatic range, and since the hold valve 408 can be used at any time there exists a need to inform the operator as to the gear he will return to should he remove his foot from pedal 410 or shift the gear lever to a higher setting. This requirement can be fulfilled by adding a dial-type indicator 500 at the console (see FIG. 9). The indicator 500 may be driven off the governor drive shaft in any suitable manner. The operator can look at the indicator when using the "forced-downshift" or "hold" features and establish a set of conditions that will simplify cyclic operation. In other words, during a vehicle loading, transporting, dumping and returning sequence, the terrain frequently causes repetitive conditions to be encountered. After two or three trial runs, the automatic upper limit "hold" might be used in place of the foot-operated hold valve 408 to relieve foot strain, etc. Alternatively, the hold feature might be needed only once in the cycle to prevent automatic shifting and to maintain engine speed at a given high value for response purposes or a given low value for economy.

What is claimed is:

1. A hydraulic control system for a multi-speed transmission having drive components associated to produce a first pre-selected group of gear ratios comprising a manual range of operation and a second preselected group of gear ratios comprising an automatic range of operation; said control system comprising a manual control valve; a group of automatic selector valves; a power control valve; fluid conduit connections interconnecting said manual control valve with both said group of automatic selector valves and said power control valve; said power control valve connected to gear ratio control means for producing gear ratios in both the manual and automatic ranges; means for preventing operation of said automatic selector valves when said manual control valve is in the manual range to hold said transmission in a selected gear ratio determined by the position of the manual control valve; and means for permitting operation of said automatic selector valves when said manual control valve is in the automatic range whereby said transmission may automatically shift in a range including the highest gear in manual range and the gear in automatic range selected by positioning of said manual control valve.

2. A hydraulic control system as set forth in claim 1 wherein holding means are provided for preventing said transmission from shifting out of any given gear.

3. A hydraulic control system for a multiple speed ratio power transmission mechanism having a plurality of drive establishing means and an output member; said control system comprising a fluid pressure source; hydraulic governor means in fluid communication with said fluid pressure source and operably connected to said transmission output member for producing a plurality of hydraulic governor pressure signals that are functionally related in magnitude to the speed of said output member; a plurality of selector valves each of which is operable to automatically select and initiate a different speed ratio change; conduit structure for transmitting one of each of said governor pressure signals to a first end of one of said selector valves; a plurality of shift reference valves in fluid communication with said fluid pressure source and each of which has flow restricting means to produce a distinct and smaller shift reference pressure than the pressure emanating from said fluid pressure source; conduit structure for transmitting one of each of said shift reference pressures to a second end of one of said selector valves; whereby said selector valves automatically initiate an upshift to a speed ratio resulting in higher speed for said output member when said governor pressure signals exceed said shift reference pressure values and automatically initiate a downshift to a speed ratio resulting in a lower speed for said output member when said shift reference pressure values exceed said governor pressure signals; said selector valves further having pressure sensitive means located between their first and second ends for insuring that downshifts occur only after said shift reference pressure values exceed said governor pressure signals by a predetermined amount; and blocking valve means located downstream of said governor and in fluid communication with both said governor pressure signal conduits and said fluid pressure source for preventing transmission of said governor pressure signals to said selector valves should pressure in the system drop below a predetermined value.

References Cited

UNITED STATES PATENTS

| | | | |
|---|---|---|---|
| 3,313,183 | 4/1967 | Bailey et al. | 74—752 |
| 3,336,815 | 8/1967 | Leonard | 74—752 X |
| 3,048,055 | 8/1962 | Borman et al. | 74—732 X |
| 3,103,129 | 9/1963 | Egbert et al. | 74—732 X |
| 3,121,342 | 2/1964 | Breting et al. | 74—732 X |

ARTHUR T. McKEON, *Primary Examiner.*

U.S. Cl. X.R.

74—688, 759; 192—109